United States Patent [19]

Culter et al.

[11] Patent Number: 5,431,292

[45] Date of Patent: Jul. 11, 1995

[54] FLEXIBLE BOTTLE HAVING AN IMPROVED, INTEGRAL CLOSURE

[75] Inventors: John D. Culter, Edina; David V. Harmann, Delano; H. Eugene Hite, Jr., Long Lake; John P. Rebhorn, Maple Grove, all of Minn.; Wade J. Groetsch, Troy, Ohio

[73] Assignee: General Mills, Inc., Minneapolis, Minn.

[21] Appl. No.: 221,545

[22] Filed: Mar. 31, 1994

Related U.S. Application Data

[63] Continuation of Ser. No. 822,252, Jan. 17, 1992, abandoned.

[51] Int. Cl.6 .................................................. B65D 1/02
[52] U.S. Cl. ..................................... 215/48; 215/253; 215/305
[58] Field of Search ................ 215/31, 32, 250, 253, 215/295, 305; 222/541

[56] References Cited

U.S. PATENT DOCUMENTS

| Re. 32,379 | 3/1987 | Touzani . | |
|---|---|---|---|
| D. 199,154 | 9/1964 | Koch . | |
| D. 245,576 | 8/1977 | Muscatiello et al. . | |
| D. 248,827 | 8/1978 | Goldschmidt et al. . | |
| D. 268,810 | 5/1983 | Hartung . | |
| D. 301,836 | 6/1989 | van Lit . | |
| D. 304,683 | 11/1989 | Hofer . | |
| D. 324,333 | 3/1992 | Griffin et al. | D9/529 |
| 2,044,837 | 6/1936 | Davis . | |
| 2,342,372 | 2/1944 | Scherer | 215/32 X |
| 3,171,446 | 3/1965 | Koch . | |
| 3,185,353 | 5/1965 | Mercier . | |
| 3,204,835 | 9/1965 | Michel | 215/32 X |
| 3,272,366 | 9/1966 | Ikeda | 215/32 X |
| 3,356,244 | 12/1967 | Witchell | 215/32 |
| 3,366,289 | 1/1968 | Badavas et al. | 222/541 |
| 3,416,712 | 12/1968 | Shastal . | |
| 3,721,360 | 3/1973 | Collie | 215/32 |
| 4,207,990 | 6/1980 | Weiler et al. | 215/32 X |
| 4,248,227 | 2/1981 | Thomas | 215/32 X |
| 4,458,818 | 7/1984 | Hansen . | |
| 4,566,613 | 1/1986 | Anscomb | 215/32 X |
| 4,572,412 | 2/1986 | Brach et al. . | |
| 4,610,366 | 9/1986 | Estes et al. . | |
| 4,620,638 | 11/1986 | Schmidt . | |
| 4,645,078 | 2/1987 | Reyner . | |
| 4,669,640 | 6/1987 | Ando et al. . | |
| 4,785,951 | 11/1988 | Bennett | 215/32 |
| 4,795,065 | 1/1989 | Ashizawa et al. . | |
| 4,955,493 | 9/1990 | Touzani . | |
| 4,979,630 | 12/1990 | Rose et al. | 215/32 |
| 4,995,519 | 2/1991 | Rose et al. | 215/32 |
| 5,046,627 | 9/1991 | Hansen | 215/31 |
| 5,076,452 | 12/1991 | Hashimoto . | |
| 5,188,250 | 2/1993 | Kovacic et al. . | |

FOREIGN PATENT DOCUMENTS

| 2454191 | 5/1976 | Germany | 215/32 |
|---|---|---|---|
| 2039267 | 8/1980 | United Kingdom | 215/32 |

*Primary Examiner*—Stephen P. Garbe
*Attorney, Agent, or Firm*—L. MeRoy Lillehaugen; John A. O'Toole; Alan D. Kamrath

[57] ABSTRACT

A closure (10) is shown including a U-shaped handle (27) integrally connected to a cap (22) in turn integrally connected to the end wall (18) of a bottle (12) to seal the opening (20) formed therein. The handle (27) includes a lever element (28) in the preferred form of a hollow body (30) integrally connected to the cap (22) by a web (32) and for providing leverage in twisting the cap (22) off the end wall (18). First and second wings (36) are integrally connected to the lever element (28) for increasing the size of closure (10) to be larger than a small part. In the preferred form, each of the wings (36) includes a solid trailing portion (44) and a hollow tube (38) in fluid communication with the hollow body (30). The trailing portions (44) are compression molded by the mold halves (54) utilized to blow mold the bottle (12). The hollow tubes (38) are compression molded and thermoformed in the mold halves (56) forming the end wall (18), the cap (22), and the lever element (28).

20 Claims, 4 Drawing Sheets

FLEXIBLE BOTTLE HAVING AN IMPROVED, INTEGRAL CLOSURE

This is a continuation of application Ser. No. 07/822,252 filed on Jan. 17, 1992, now abandoned.

BACKGROUND

The present invention relates generally to bottles having integral closures and their method of manufacture, particularly to closures which are twisted to break the integral connection of the closure to the bottle and open the bottle, and specifically to improved closures which are of a size which are likely not to be swallowed or result in choking if placed in the mouth after removal from the bottle.

In the marketing of drinks such as fruit juice drinks, bottles of low and high density polyethylene have been utilized. In their manufacture, a molten polyethylene tube is placed in a mold, with the lower portion of the bottles being formed by blow molding and the upper portion including the closure generally being formed by compression molding and thermoforming. In a preferred form, the drink liquid can be introduced through the molten polyethylene tube after the formation of the lower portion of the bottle and before the formation of the upper portion which then seals the drink in the bottle. Alternately, the upper portion could be initially formed with suitable provisions which allow the later introduction of drink liquid and sealing thereafter. In any case, the closure includes provisions for allowing ease of removal even for small children such as by twisting off. After removal of the closure, the drink can be forced out the closure opening by squeezing the lower portion of the bottle and thus decreasing the interior volume of the bottle. Thus, the bottle itself has considerable play value in addition to product value in the marketing of drinks. An example of product currently available on the market is SQUEEZIT ® drinks of General Mills, Inc. of Minneapolis, Minn.

It should then be noted that the closure is typically removed from the bottle before consumption of the drink. Depending upon the particular design, safety concerns have arisen about the possibility of the closure causing choking or being swallowed, especially if the product is directed to relatively young children from ages 5 to 12 years.

Thus, because of these concerns, a need has arisen for improved closure systems which generally prevent the child from swallowing or choking on the removed closure in the event it is placed in the mouth, which can be manufactured in a compatible manner to the manner in which such bottles are currently manufactured and filled, and which does not detract from and preferably even enhances the play value of the bottle.

SUMMARY

This need and other problems in the field of integral closures for bottles are solved by the present invention by providing, in the preferred form, wings integrally formed with the means providing the leverage to break the integral connection of the cap to the bottle end wall and expose the bottle opening and increasing the size of the closure to that which is not likely to be swallowed or result in choking if the closure is placed in the mouth after removal and with the wings having a rigidity to substantially resist flexing when the closure is removed from the bottle.

In a preferred aspect of the present invention, the bottle and the closure are formed by blow molding the lower portion and compression molding and thermoforming the upper portion of a tube of molten, flexible material, with the wings, the leverage providing means, the cap, and the bottle end wall being simultaneously and integrally formed.

It is thus an object of the present invention to provide a novel flexible bottle having an improved, integral closure.

It is further an object of the present invention to provide such an improved closure of a size which is not likely to be swallowed or result in choking if the closure is placed in the mouth after removal.

It is further an object of the present invention to provide such an improved closure having a rigidity to substantially resist deformation when transferring torque to twist the closure from the bottle.

It is further an object of the present invention to provide such an improved closure which is generally not compressible to a small size susceptible to being swallowed or cause choking and to prevent conformation to the shape of the windpipe.

It is further an object of the present invention to provide such an improved closure which can be manufactured in a compatible manner to the manner in which prior flexible bottles having integral closures were manufactured and filled.

It is further an object of the present invention to provide such an improved closure which maximizes three-dimensional space while minimizing the material used.

It is further an object of the present invention to provide such an improved closure which does not detract from the play value of the bottle.

It is further an object of the present invention to provide such an improved closure which is easy to remove even by small children.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "upper", "lower", and similar terms are used herein, it should be understood that these terms have reference only to the structure shown in the drawings as it would appear to a person viewing the drawings and are utilized only to facilitate describing the invention.

DESCRIPTION

An improved closure for a bottle according to the preferred teachings of the present invention is shown in the drawings and generally designated 10. In the preferred form and as with existing designs, closure 10 and bottle 12 are integrally formed of relatively soft, flexible material such as plastic and particularly low density polyethylene. Bottle 12 in the preferred form is generally in the shape of a generic soda pop bottle for individual consumption and in the most preferred form has a slightly elongated length and slightly reduced width from the same size soda pop bottle. Generally, bottle 12 includes a neck portion 14 of any desired configuration having a generally cylindrical or tubular portion 16 terminating in an integral end wall 18. End wall 18 in the preferred form shown is dome-shaped and includes the opening 20 through which the drink liquid passes from bottle 12 during consumption. Specifically, end wall 18 is of a size for placement of its periphery at least adjacent the lips of the person drinking the liquid from bottle 12 through opening 20.

Figures 1, 2, 3:
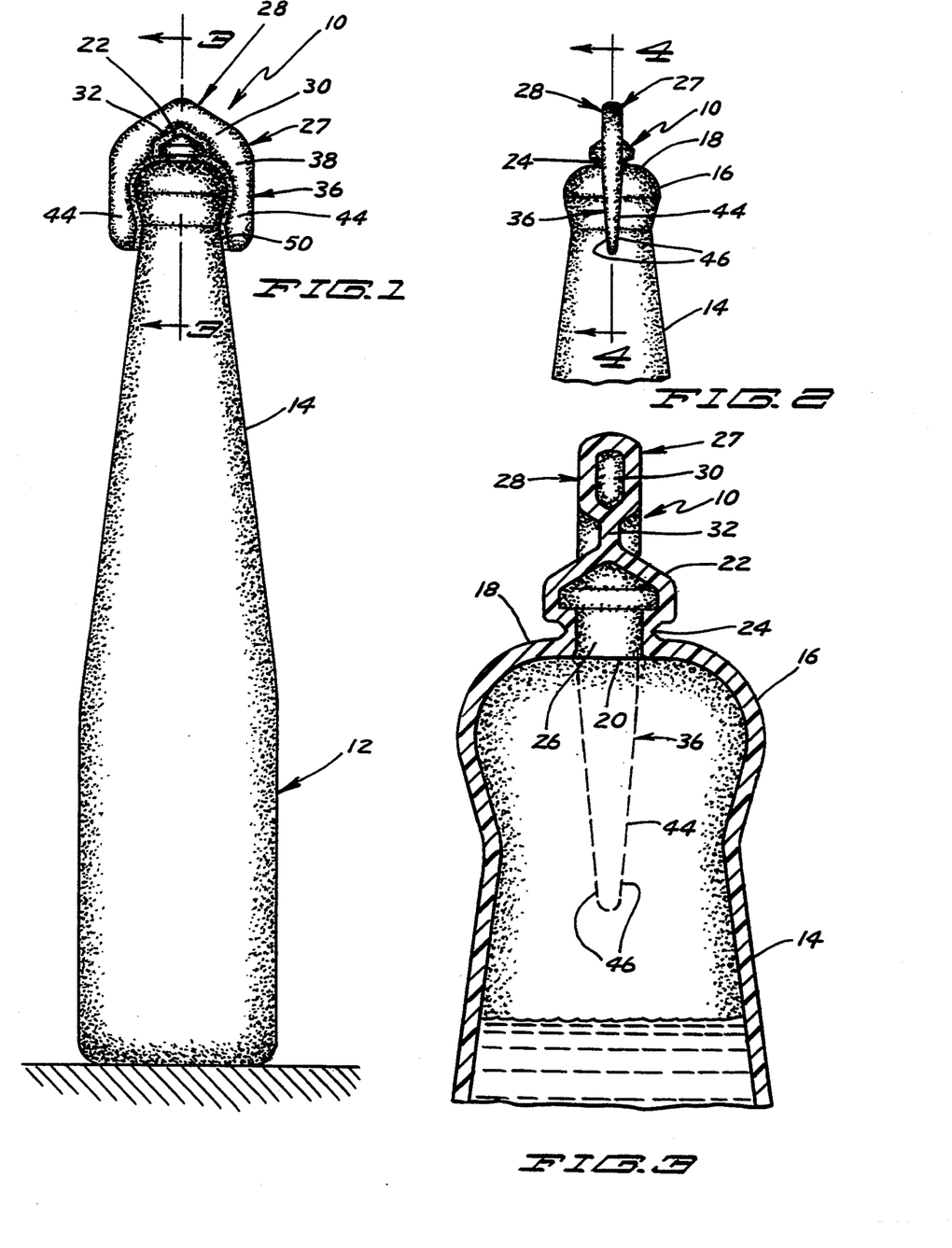
FIG. 1 shows a front view of a flexible bottle having an integral closure according to the preferred teachings of the present invention.
FIG. 2 shows a partial, side view of the bottle and closure of FIG. 1.
FIG. 3 shows a cross-sectional view of the bottle and closure of FIG. 1 according to section line 3—3 of FIG. 1.
Figure 4:
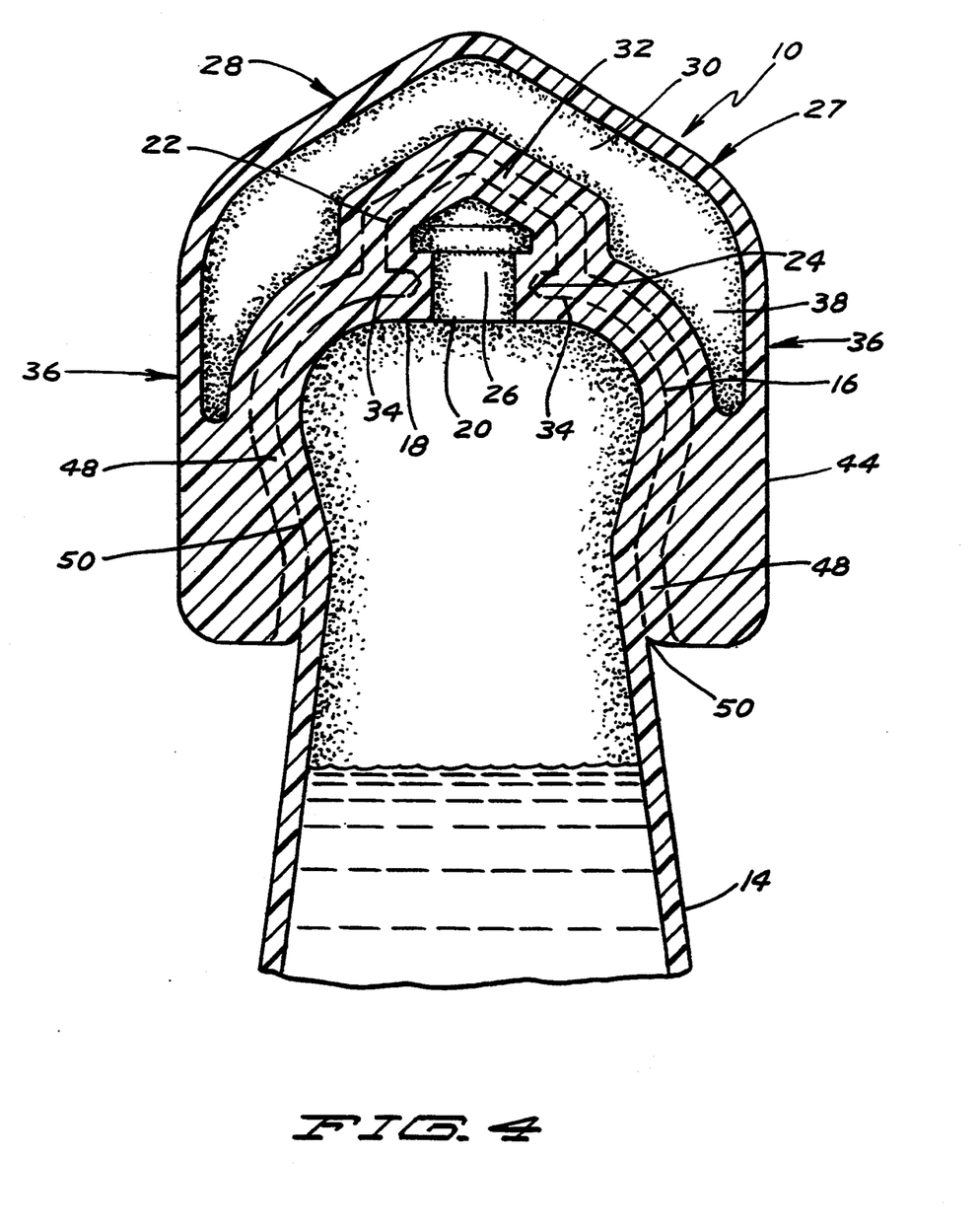
FIG. 4 shows a cross-sectional view of the bottle and closure of FIG. 1 according to section line 4—4 of FIG. 2.

Closure 10 includes a cap 22 of any desired configuration including existing designs and of a size complementary to and for integral connection to end wall 18 for closing opening 20. In the preferred form, closure 10 allows for ease of removal of cap 22 from bottle 12 even for small children. Particularly, a reduced neck or wall portion 24 is formed at the interconnection of cap 22 to bottle 12 in the most preferred form by pinching the molten polyethylene at that location during the manufacture of closure 10 and bottle 12. In the most preferred form, cap 22 is hollow and includes an opening 26 which is integral with and coextensive with opening 20, with reduced neck or wall portion 24 forming and defining openings 20 and 26.

Closure 10 according to the preferred teachings of the present invention further includes a generally U-shaped handle 27 integrally formed to cap 22. Handle 27 performs two functions which will be set forth in more detail hereinafter. Specifically, in the preferred form and as with existing designs, cap 22 is removed from bottle 12 by twisting cap 22 breaking reduced neck or wall portion 24 by torque forces, with opening 20 being exposed after removal of cap 22 of closure 10. Thus, handle 27 includes a lever element 28 for providing leverage when grasped in twisting cap 22, with lever element 28 being integrally formed with cap 22 and of any desired configuration including existing designs. In the preferred form shown, lever element 28 is of a three-dimensional configuration including a generally hollow body 30 having a V-shape in planes parallel to the U-shaped configuration of handle 27. Body 30 has a length which is generally equal to the diameter of end wall 18 and has a width which is substantially less than the diameter of end wall 18. In the preferred form, a flat web 32 extends between body 30 and cap 22 and end wall 18. Web 32 includes a construction allowing ease of removal of web 32 from end wall 18 shown in the preferred form as a reduced wall portion 34 at the interconnection with end wall 18. Reduced wall portion 34 can have a minimal thickness or be in the form of a gap or space at the junction of web 32 to end wall 18. It can then be appreciated that lever element 28 provides a handle-like, diametric shape to cap 22 for ease of gripping in twisting and breaking cap 22 from end wall 18. It should be noted that although cap 22 and lever element 28 of the preferred form could be small enough to be classified as a small part as that term is utilized in the toy industry, cap 22 and lever element 28 are not prone to result in choking if swallowed due to its three-dimensional, inflexible configuration arising from the hollow construction of body 30, with the hollow construction also being advantageous in reducing the amount of material necessary in forming cap 22 and body 30.

Handle 27 of closure 10 according to the teachings of the present invention further includes structure for increasing the size of cap 22 and lever element 28 to be larger than a small part as that term is utilized in the toy industry and particularly to be larger than a size which can be swallowed or result in choking if placed in the mouth. Specifically, in the preferred form, handle 27 includes first and second wings 36 integrally formed with lever element 28. Additionally, in the preferred form, wings 36 extend beyond and are located radially outward of end wall 28 and cylindrical portion 16 a distance generally less than the largest diameter of bottle 12. In the most preferred form, cap 22, lever element 28, and wings 36 form the generally U-shape of handle 27 with first and second wings 36 diametrically opposite to each other from generally cylindrical portion 16. In the most preferred form, each of the wings 36 includes a first portion in the form of a hollow tube 38 having an open end integrally connected to lever element 28. Tubes 38 of first and second wings 36 and body 30 of lever element 28 are in fluid communication with each other and form a single hollow chamber. Tubes 38 opposite lever element 28 terminate in a solid trailing portion 44 which is generally wedge-shaped. Particularly, trailing portion 44 includes first and second planar, flat, generally radially arranged, vertical walls 46 integrally secured by side walls in a V-configuration. The radially inner edges of trailing portions 44 are complementary to the shape of generally cylindrical portion 16. Wings 36 further include a flat web 48 integrally extending between wings 36 and cylindrical portion 16. Web 48 includes a construction allowing ease of removal from cylindrical portion 16 shown in the preferred form as a reduced wall portion 50 at the interconnection with cylindrical portion 16. Reduced wall portion 50 can have a minimal thickness or can be in the form of a gap or space at the junction of web 48 to cylindrical portion 16.

Figure 5A:
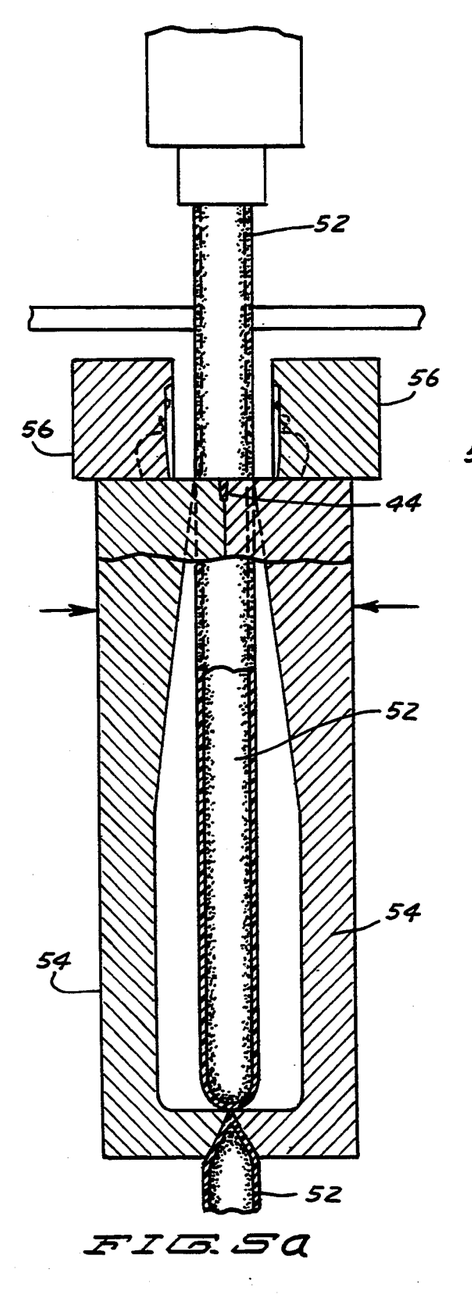
FIGS. 5a–5d show diametric views of the method of manufacture of the bottle and closure of FIG. 1.
Figure 5B:
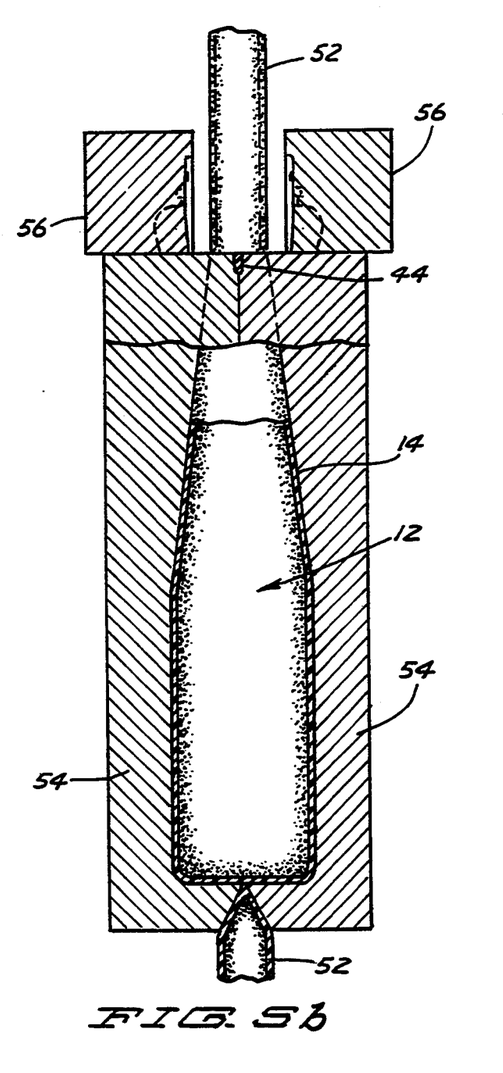
Figure 5C:
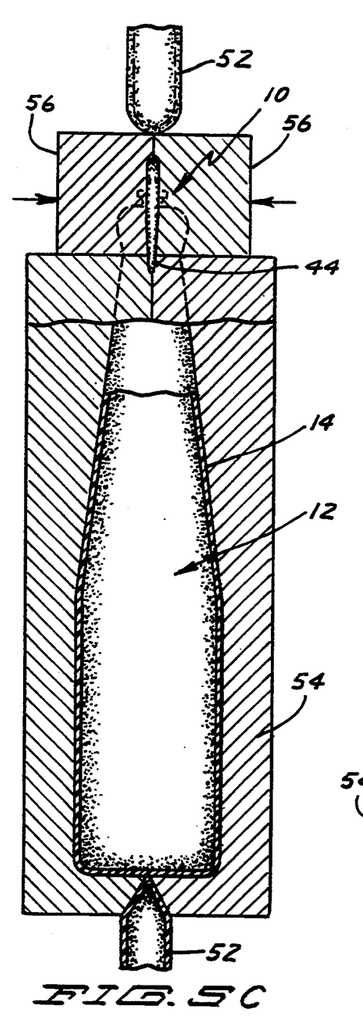
Figure 5D:
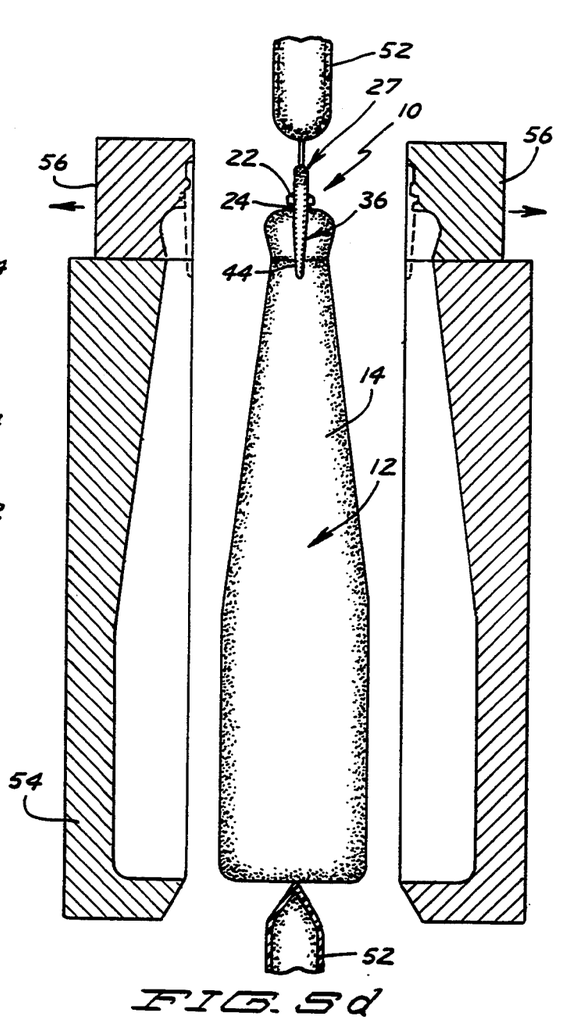

Now that the basic construction of closure 10 according to the preferred teachings of the present invention have been explained, preferred methods of manufacture, the operation, and subtle features of closure 10 can be set forth and appreciated. During the manufacture of bottle 12, cap 22, and lever element 28, flashing is created radially outwardly therefrom which is normally cut away and reused in the manufacture of later bottles 12, caps 22, and lever elements 28. The present invention then utilizes portions of this flash to create wings 36. Particularly, in a preferred form of the present invention, bottle 12 and closure 10 can be manufactured in the manner shown in FIGS. 5a–5d. Specifically, a tube 52 of hot parison is extruded between two main mold halves 54 which are then closed to weld the lower end of tube 52 and to compression form trailing portions 44 of closure 10 as shown in FIG. 5a. Tube 52 is then cut and inflated within closed mold halves 54 by blowing air until the parison is held by vacuum on the cavity walls of closed mold halves 54 to form bottle 12 as shown in FIG. 5b. Bottle 12 can be filled with fluid before or after formation of the remaining portions of closure 10. In any case, thereafter head mold halves 56 then close together with tubes 38, lever element 28, cap 22, and webs 32 and 48 associated therewith being formed by compression molding and thermoforming therein as shown in FIG. 5c. After sufficient cooling, mold halves 54 and 56 open and the filled bottle 12 sealed by closure 10 drops out or is removed by means of an optional gripper or other delivery device, not shown, as generally set forth in FIG. 5d. Thereafter, any remaining flashing from closure 10 and bottle 12 is removed.

It can then be appreciated that closure 10 of the present invention can be manufactured in a compatible manner to the manner in which bottles 12, caps 22, and lever elements 28 are currently manufactured and filled, with only a slight change in the molds and flash cutting procedure. In the preferred form of the present invention, tubes 38 of wings 36 are of a three-dimensional configuration and can be formed by utilizing vacuum ports in head mold halves 56 which draw the molten plastic to the outer wall of the mold cavity (in a similar manner as the upper section of neck portion 14 is currently formed) to create the single hollow chamber defined by body 30 and tubes 38 of wings 36. During molding, reduced wall portions 34 and 50 are formed by pinch lines in the portions of the molds forming webs 32 and 48.

The three-dimensional configuration of wings 36 is particularly advantageous for several reasons. Specifically, the three-dimensional configuration is very rigid in comparison to a single layer of material in the order of the thickness of web 48. Such rigidity is important in providing leverage in twisting cap 22 off end wall 18. Particularly, a single layer of material would tend to deform and twist if gripped and a torque force were placed thereon when attempting to open bottle 12 whereas wings 36 have a rigidity sufficient to resist such deformation and transferring the torque force to reduced neck or wall portion 24 to easily twist off cap 22, with the increased length of wings 36 providing a significant leverage advantage which is very important for very small children attempting to open bottle 12. Additionally, although not a small part as that term is utilized in the toy industry, a closure utilizing flexible wings could be compressed to a small part size, while wings 36 of the most preferred form provide sufficient rigidity to substantially resist compression to a small part size. Thus, closure 10 according to the most preferred teachings of the present invention has less possibility of being lodged in the throat. Also, flexible parts can collapse and conform to the shape of the windpipe and function as a valve causing choking if lodged in the throat whereas the rigidity of wings 36 prevents closure 10 from conforming to the shape of the windpipe and will allow air passage even if closure 10 becomes lodged in the throat, reducing the possibility of choking.

The hollow nature of tubes 38 of wings 36 is also particularly advantageous for several reasons. Specifically, the bends and interconnections of the material forming tubes 38 of wings 36 provide the strength and rigidity to obtain the advantages of the three-dimensional configuration while reducing the amount of material necessary to form tubes 38 of wings 36 especially over wings of a single layer of a thickness necessary to provide the desired rigidity. Also, the physical size of wings 36 is important to reduce the possibility of closure 10 being swallowed or becoming lodged in the throat, with the hollow nature allowing the physical size to be much larger with the amount of material utilized to form wings 36. The wedge-shape of trailing portion 44 of wings 36 of the preferred form of closure 10 according to the teachings of the present invention is particularly advantageous in the molding of wings 36 and their removal from the formation molds. It should further be appreciated that wings 36 can be formed by other manners. For example, trailing portion 44 of tube 38 could be formed by blow molding with the lower portion of bottle 12 whereas the remaining portions of wings 36 could be formed by compression molding and thermal forming with the upper portion of bottle 12. Likewise, the lower portion of bottle 12 could be formed as a separate part such as by blow molding from the remaining portion of bottle 12 and closure 10 formed as a separate part such as by compression molding and thermal forming and which is integrally connected thereto such as by welding, spin melting, or the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A bottle for holding a product to be consumed by a person having a mouth and lips, with the bottle having an end wall including a periphery and a bottle opening substantially smaller than the periphery, having a generally tubular portion terminating in the periphery of the end wall, and having a closure including a cap integrally formed with the end wall and closing the bottle opening, with the closure further including means integrally formed with the cap for providing leverage to twist the cap relative to the end wall to break the cap from the end wall and expose the bottle opening, with the end wall being of a size for placement of the periphery at least adjacent the lips of the person consuming the product from the bottle through the bottle opening, the improvement comprising at least a first wing integrally formed with the leverage providing means for providing additional leverage to twist the cap relative to the end wall to break the cap from the end wall and for increasing the size of the closure to be larger than a small part which can be swallowed or result in choking if placed in the mouth after removal from the end wall, with the first wing extending downwardly beyond the end wall of the bottle and radially outwardly from the generally tubular portion of the bottle; wherein the first wing is integrally connected by a web to the generally tubular portion, with the web extending downwardly beyond the end wall of the bottle and radially outwardly from the generally tubular portion of the bottle; and wherein the bottle and the closure further comprises, in combination: means formed in the web for allowing ease of removal of the web from the generally tubular portion, with the closure including the cap, the leverage providing means, the wing, and the web being removable from the bottle when the cap is broken from the end wall and the web is removed from the generally tubular portion.

2. The bottle and the closure of claim 1 wherein the web is integrally interconnected to the generally tubular portion of the bottle along an interconnection; wherein the allowing means comprises a reduced wall portion in the web at the interconnection to the generally tubular portion of the bottle.

3. The bottle and the closure of claim 1 wherein the product is a liquid.

4. The bottle and the closure of claim 1 wherein the generally tubular portion has an axis; and wherein the first wing has a solid trailing portion, with the trailing portion of the first wing being generally wedge-shaped and including first and second walls in a V-configuration, with the first and second walls extending radially from the generally tubular portion and in a non-parallel manner to the axis of the generally tubular portion.

5. A bottle for holding a product to be consumed by a person having a mouth and lips, with the bottle having an end wall including a periphery and a bottle opening substantially smaller than the periphery, having a generally tubular portion terminating in the periphery of the end wall, and having a closure including a cap integrally formed with the end wall and closing the bottle opening, with the closure further including means integrally formed with the cap for providing leverage to twist the cap relative to the end wall to break the cap from the end wall and expose the bottle opening, with the end wall being of a size for placement of the periphery at least adjacent the lips of the person consuming the product from the bottle through the bottle opening, the improvement comprising at least a first wing integrally formed with the leverage providing means for providing additional leverage to twist the cap relative to the end wall to break the cap from the end wall and for increasing the size of the closure to be larger than a small part which can be swallowed or result in choking if placed in the mouth after removal from the end wall, with the first wing extending downwardly beyond the end wall of the bottle and radially outwardly from the generally tubular portion of the bottle; wherein the first wing is integrally connected by a web to the generally tubular portion of the bottle, with the web extending downwardly beyond the end wall of the bottle and radially outwardly from the generally tubular portion of the bottle; and wherein the bottle and the closure further comprise, in combination: means formed in the web for allowing ease of removal of the first wing from the generally tubular portion of the bottle, with the closure being removable from the bottle when the cap is broken from the end wall and the first wing is removed from the generally tubular portion.

6. The bottle and the closure of claim 5 formed from a length of tubing of molten, flexible material, wherein the lower portion of the bottle and the closure is formed from blow molding and compression molding the tubing and the upper portion of the bottle and the closure is formed from compression molding and thermoforming of the tubing.

7. The bottle and the closure of claim 5 wherein the wing has a rigidity to substantially resist flexing when the cap is broken from the end wall.

8. The bottle and closure of claim 5 wherein the product is a liquid.

9. The bottle and the closure of claim 5 wherein the wing has a three-dimensional configuration.

10. The bottle and the closure of claim 9 wherein at least a first portion of the wing is hollow.

11. The bottle and the closure of claim 5 wherein the generally tubular portion has an axis; and wherein the first wing has a solid trailing portion, with the trailing portion of the first wing being generally wedge-shaped and including first and second walls in a V-configuration, with the first and second walls extending radially from the generally tubular portion and in a non-parallel manner to the axis of the generally tubular portion.

12. The bottle and the closure of claim 11 wherein the leverage providing means comprises a hollow body, with the first portion of the first wing and the hollow body forming and defining a single hollow chamber.

13. A bottle for holding liquid to be drunk by a person having a mouth and lips, with the bottle having an end wall including a periphery and a bottle opening, having a generally tubular portion terminating in the end wall, and having a closure including a cap integrally formed with the end wall and closing the bottle opening, with the closure further including means integrally formed with the cap for providing leverage to twist the cap relative to the end wall to break the cap from the end wall and expose the bottle opening, with the end wall being of a size for placement of the periphery at least adjacent the lips of the person drinking the liquid from the bottle through the bottle opening, the improvement comprising, in combination: at least a first wing integrally formed with the leverage providing means for providing additional leverage to twist the cap relative to the end wall to break the cap from the end wall and for increasing the size of the closure to be larger than a small part which can be swallowed or result in choking if placed in the mouth after removal from the end wall, with the first wing being integrally connected by a web to the generally tubular portion of the bottle, with the web extending downwardly beyond the end wall of the bottle and radially outwardly from the generally tubular portion of the bottle; and means formed in the web for allowing ease of removal of the web from the generally tubular portion of the bottle, with the closure including the cap, the leverage providing means, the first wing, and the web being removable from the bottle when the cap is broken from the end wall and the web is removed from the generally tubular portion.

14. The bottle and the closure of claim 13 wherein the wing has a rigidity to substantially resist flexing when the cap is broken from the end wall.

15. The bottle and the closure of claim 1 further comprising, in combination: a second wing extending radially outwardly from the generally tubular portion of the bottle diametrically opposite to the first wing.

16. The bottle and the closure of claim 15 wherein the wings have a three-dimensional configuration.

17. The bottle and the closure of claim 16 formed from a length of tubing of molten, flexible material, wherein the lower portion of the bottle and the closure is formed from blow molding and compression molding the tubing and the upper portion of the bottle and the closure is formed from compression molding and thermoforming the tubing.

18. The bottle and the closure of claim 16 wherein at least first portions of the wings are hollow.

19. The bottle and the closure of claim 18 wherein the generally tubular portion has an axis; and wherein each of the wings have a solid trailing portion, with each of the trailing portions of the wings being generally wedge-shaped and including first and second walls in a V-configuration, with the first and second walls extending radially from the generally tubular portion and in a non-parallel manner to the axis of the generally tubular portion.

20. The bottle and the closure of claim 18 wherein the leverage providing means comprises a hollow body, with the first portions of the wings and the hollow body forming and defining a single hollow chamber.

* * * * *

UNITED STATES PATENT AND TRADEMARK OFFICE
CERTIFICATE OF CORRECTION

PATENT NO. : 5,431,292
DATED : July 11, 1995
INVENTOR(S) : John D. Culter, et al It is certified that error appears in the above-indentified patent and that said Letters Patent is hereby corrected as shown below:

On the title page item [56], insert

-- Better Homes and Gardens, May 1993, pg. 50, advertisement for Mondo Fruit Squeezers ---

Column 8, line 56; "claim 1" should be -- claim 13 --.

Signed and Sealed this

Nineteenth Day of September, 1995

Attest:

BRUCE LEHMAN

Attesting Officer

Commissioner of Patents and Trademarks

UNITED STATES PATENT AND TRADEMARK OFFICE
Certificate

Patent No. 5,431,292

Patented: July 11, 1995

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John D. Culter, Edina, Minn.; David V. Harmann, Delano, Minn.; H. Eugene Hite, Jr., Long Lake, Minn.; John P. Rebhorn, Maple Grove, Minn.; Wade J. Groetsch, Troy, Ohio; and Bernd Hansen, Germany.

Signed and Sealed this Second Day of June, 1998.

ALLAN N. SHOAP, *SPE*
Art Unit 3727